United States Patent [19]

Lewis

[11] Patent Number: 5,562,939
[45] Date of Patent: Oct. 8, 1996

[54] METHOD OF SUSPENDING INCLUSIONS AND COMPOSITIONS PRODUCED THEREBY

[75] Inventor: James A. Lewis, Park Ridge, N.J.

[73] Assignee: Bush Boake Allen Inc., Montvale, N.J.

[21] Appl. No.: 406,211

[22] Filed: Jan. 27, 1995

[51] Int. Cl.$^6$ ............................... A23L 1/05; A23L 1/275
[52] U.S. Cl. ........................ 426/250; 426/573; 426/599
[58] Field of Search ................................... 426/250, 573, 426/575, 576, 577, 599, 589

[56] References Cited

U.S. PATENT DOCUMENTS

| | | | |
|---|---|---|---|
| 2,821,479 | 1/1958 | Forkner | 426/573 |
| 2,834,679 | 5/1958 | Stoloff | 426/573 |
| 2,853,386 | 9/1958 | Hughes | 426/573 |
| 3,615,645 | 10/1971 | Forkner | 426/573 |
| 3,734,745 | 5/1973 | Cassanelli et al. | 426/575 |
| 3,892,870 | 7/1975 | Wood | 426/573 |
| 3,947,604 | 3/1976 | McGinley et al. | 426/573 |
| 3,969,536 | 7/1976 | Ikeda et al. | 426/573 |
| 4,092,437 | 5/1978 | Claasen | 426/573 |
| 4,219,572 | 8/1980 | Jackman | 426/573 |
| 4,382,966 | 5/1983 | Mickus et al. | 426/573 |
| 4,500,552 | 2/1985 | Kadison et al. | 426/576 |
| 4,503,084 | 3/1985 | Baird et al. | 426/573 |
| 4,647,470 | 3/1987 | Sanderson et al. | 426/573 |
| 4,759,936 | 7/1988 | Best et al. | 426/575 |
| 4,894,250 | 1/1990 | Musson et al. | 426/575 |
| 5,102,676 | 4/1992 | Aldcroft et al. | 426/573 |
| 5,213,834 | 5/1993 | Ikeda et al. | 426/573 |
| 5,236,730 | 8/1993 | Yamada et al. | 426/573 |
| 5,260,083 | 11/1993 | Brain et al. | 426/573 |
| 5,294,457 | 3/1994 | Jenkins et al. | 426/573 |
| 5,376,396 | 12/1994 | Clark | 426/573 |
| 5,387,427 | 2/1995 | Lawrence et al. | 426/573 |
| 5,417,990 | 5/1995 | Soedjak et al. | 426/575 |

FOREIGN PATENT DOCUMENTS

| | | |
|---|---|---|
| 0479126 | 4/1992 | European Pat. Off. . |
| 2168366 | 6/1986 | United Kingdom . |
| 2219803 | 12/1989 | United Kingdom . |

*Primary Examiner*—Jeanette Hunter
*Attorney, Agent, or Firm*—Beth Kovitz Fields; Charles A. Gaglia, Jr.; Wendy A. Taylor

[57] ABSTRACT

A method for suspending inclusions in an acidic or alcoholic liquid composition is provided. The method includes the steps of preparing a pre-gel solution including gellan gum in water, providing a liquid composition having inclusions, and incorporating the pre-gel solution into the liquid composition. Alternatively, the liquid composition can be provided without inclusions and the inclusions may be added after the pre-gel solution is incorporated into the liquid composition. Upon standing, the pre-gel solution will cause the inclusions to suspend in the liquid composition. Acidic or alcoholic liquid compositions having suspended particulates or inclusions are also provided.

22 Claims, No Drawings

METHOD OF SUSPENDING INCLUSIONS AND COMPOSITIONS PRODUCED THEREBY

FIELD OF THE INVENTION

This invention relates generally to inclusions in liquid compositions and in particular, to a method of suspending such inclusions in an acidic or alcoholic liquid composition.

BACKGROUND OF THE INVENTION

Inclusions in a liquid composition are more visually attractive if the inclusions are suspended throughout the liquid composition. For example, it is often desirable to incorporate particulate matter or inclusions in beverages. However, there is a tendency for such inclusions to sink to the bottom or float to the top of the beverage. This is expecially true if the inclusions are larger than about one (1) cubic millimeter.

Prior art methods of preventing inclusions from sinking to the bottom or floating to the top of a beverage have met with only limited success. For example, one standard method for making beverage flavoring or clouding emulsions is to make the density of the inclusions or particulates identical to the density of the surrounding aqueous phase. However, this requires that permitted weighting agents must be dissolved in the oil phase of the emulsion. As a result, this method is only useful for small inclusions of the order of about 3 to 10 microns.

For larger particles, gravity balancing may be achieved, but only for one set of conditions, e.g. solids content of the beverage, solids content of the particles or inclusions, size of the particles or inclusions, and temperature. Variation from this fixed set of conditions invariably leads to separation.

Increasing the viscosity of the liquid composition using certain gums and starches is a technique that can be used to delay separation, but leads to unpleasant mouthfeel in the final product.

It would, therefore, be desirable to provide a method for suspending inclusions in a liquid composition.

It is a goal of the invention to provide a method for suspending inclusions or particulates in a liquid composition.

It is another goal of the invention to provide a method for suspending inclusions or particulates in a liquid composition or beverage having an acidic pH.

It is another goal of the invention to provide a method for suspending inclusions or particulates in an alcoholic liquid composition.

Still other goals and advantages of the invention will in part be obvious and will in part be apparent from the specification.

SUMMARY OF THE INVENTION

A method for suspending inclusions in an acidic or alcoholic liquid composition is provided. The method includes the steps of preparing a pre-gel solution including gellan gum in water, providing a liquid composition having inclusions, and incorporating the pre-gel solution into the liquid composition. Alternatively, the liquid composition can be provided without inclusions and the inclusions may be added after the pre-gel solution is incorporated into the liquid composition. Upon standing, the pre-gel solution will cause the inclusions to suspend in the liquid composition. Acidic or alcoholic liquid compositions having suspended particulates or inclusions are also provided.

The invention accordingly comprises the several steps and the relation of one or more of such steps with respect to each of the others thereof, which will be exemplified in the method hereinafter disclosed, and the scope of the invention will be indicated in the claims.

DETAILED DESCRIPTION OF THE PREFERRED EMBODIMENTS

The first step in the method of suspending inclusions in a liquid composition having an acidic pH is to provide a pre-gel solution. The pre-gel solution is a non-gelling solution including gellan gum in water. Gellan gum is a fermentation hydrocolloid produced by Kelco Corp., San Diego, Calif. and is used in an amount between about 0.2% and 1.5% by weight of the solution, preferably in an amount between about 0.5% an 0.75% by weight.

The water is potable and may be treated or de-ionized prior to use. If the water has been treated or de-ionized, it is generally desirable to incorporate a suitable buffer. Suitable buffers include, but are not limited to, sodium citrate, potassium citrate, and mixtures thereof in amounts ranging between about 0.1% and 0.5% by weight, preferably in amounts ranging between about 0.2% and 0.35% by weight.

The gellan gum, water, and optional buffer are combined at room temperature and heated to a temperature between about 150° and 180° F. to yield a heated pre-gel solution. The heated pre-gel solution is allowed to cool to yield a pre-gel solution. It is important that the pre-gel solution does not gel upon cooling, but remains in a fluid, pumpable condition.

A liquid composition having inclusions is provided. The liquid composition has an acidic pH between about 2.5 and 6.0, preferably between about 2.5 and 4.0, more preferably of about 3.0. This is generally the pH range at which liquid beverages are considered to be refreshing to the palate. The amount of time required to suspend the inclusions in the liquid composition is at least partially dependent on the pH of the liquid composition.

Alternatively, the liquid composition may be alcoholic. When the liquid composition is alcoholic, the alcohol content will generally range between about 5% and 40% by volume. The liquid composition may also be both acidic with a pH between about 2.5 and 6.0 and alcoholic with an alcohol content between about 5% and 40% by volume.

The liquid composition can be hot or cold, carbonated or non-carbonated, alcoholic or non-alcoholic, caffeinated or non-caffeinated, clear or cloudy. Suitable liquid compositions include, but are not limited to, soda, coffee, tea, beer, milk, mouthwash, and the like.

The liquid composition has inclusions in an amount between about 1% and 10% by weight, preferably in an amount between about 3 and 8% by weight. Such inclusions are, for example and without limitation, pieces of a jelly-like substance as disclosed in U.S. patent application Ser. No. 08/383,038, filed on Feb. 3, 1995, which is a continuation-in-part of U.S. patent application Ser. No. 08/379,413, filed on Jan. 27, 1995, fruit pulp cells, fruit pulp particles, fruit pieces, gold particles, droplets of flavoring or clouding agents, and the like.

In an alternate embodiment provided in accordance with the invention, the liquid composition is provided without inclusions. In this case, the liquid composition is either acidic with a pH between about 2.5 and 6.0 or alcoholic with an alcohol content between about 5% and 40% by volume. When the liquid composition is provided without inclusions, such inclusions are added to the suspending solution after the pre-gel solution is incorporated into the liquid composition.

The pre-gel solution is incorporated into the liquid composition in an amount between 2% and 17.5% by volume to form a suspending solution. The pre-gel solution can be incorporated into the liquid composition at a temperature between about 40° F. (refrigerated) and 120° F. No shear is required to incorporate the pre-gel solution into the liquid composition. The final suspending solution has between about 0.02% and 0.05% by weight gellan gum. If no inclusions are present in the liquid composition, they may be added to the suspending solution. The suspending solution can be bottled and pasteurized, if desired.

The final gellan content of the suspending solution is important because, when the liquid composition is a beverage, it must be refreshing. This means that the beverage must not be too syrupy or thick to the palate. This can be accomplished by providing a beverage with inclusions and a gellan gum content of less than about 0.05% by weight of the beverage, preferably less than about 0.035% by weight. At this concentration, the presence of the gellan gum is virtually unnoticeable and yet its suspending properties are those of a much higher concentration of other gums.

The suspending solution is allowed to rest for a period of between about 2 and 24 hours depending on the actual concentration of the pre-gel solution and the pH or alcohol content of the liquid composition. The suspending solution is then agitated gently to disperse the inclusions, which will remain suspended in the liquid composition.

The following non-limiting Examples are presented for purposes of illustration only and are not to be construed in a limiting sense.

EXAMPLE 1

Seven and one-half (7.5) grams gellan gum were dry blended with 2.5 g sodium citrate. The blend was added to 1000 ml de-ionized water at room temperature with agitation. When the blend was thoroughly dispersed, the temperature was raised to 180° F. with agitation and this elevated temperature was maintained until full hydration was achieved. The solution was poured into a suitable container and allowed to cool to room temperature to produce a pre-gel solution, which remained a viscous, syrupy liquid.

A soft drink was prepared by combining 240.0 g high fructose corn syrup, 2.1 g anhydrous citric acid, 33.0 g grapefruit pulp cells, and water to yield 966 ml. Thirty-four (34) ml pre-gel syrup was added to the soft drink and agitated in a suitable container. When thoroughly blended, the resulting beverage was poured into 300 ml glass bottles. The bottles were capped and pasteurized by raising the temperature to 180° F. in a water bath and this elevated temperature was maintained for 10 minutes. The bottles were chilled under cold water and maintained in refrigerated storage at a temperature of 40° F. for 3 hours. After three hours had elapsed, the bottles were agitated by hand to disperse the grapefruit pulp cells, which remained suspended in the soft drink after dispersion.

EXAMPLE 2

A pre-gel solution was prepared as described in Example 1. A soft drink was prepared as described as in Example 1 except that the grapefruit pulp cells were replaced with pieces of a colored jelly-like substance. The pieces of the jelly-like substance remained in suspension after pasteurization and refrigerated storage.

EXAMPLE 3

A pre-gel solution was prepared as described in Example 1.

An alcoholic beverage was prepared by combining 210 mls neutral grain spirit (190° proof) and 500 mls cold water in a suitable container with gentle agitation to make a dilute alcohol solution. Two hundred seventy two (272) grams sugar was added to the dilute alcohol solution and the mixture was stirred until the sugar was totally dissolved. Color and flavor was added with 0.5 g citric acid anhydrous. After a homogeneous solution was obtained, the volume was adjusted to 966 ml with cold water.

Thirty-four (34) mls of the pre-gel solution was slowly incorporated into the alcoholic beverage with continuous stirring until it was fully dispersed.

Finally, 50 g of colored pieces of a jelly-like substance was added to the alcoholic beverage with incorporated pre-gel solution, i.e. the suspending solution, with agitation. The alcoholic suspending solution including the jelly-like substance was bottled in suitable bottles, sealed, and allowed to stand for 3 hours. After 3 hours, the bottles were agitated to disperse the jelly pieces. The jelly pieces remained suspended after the bottles were agitated.

EXAMPLE 4

A pre-gel solution was prepared as described in Example 1.

A mouthwash-type liquid composition was prepared by combining 260.0 ml 190° proof neutral grain spirit, 1.5 g sodium benzoate powder, 1.0 g Pluronic F 127, 0.9 g eucalyptol, 0.6 g thymol, 0.4 g menthol, 0.6 g methyl salicylate, and sufficient water to yield 1000 ml. A 50% solution of citric acid in water was added to bring the pH down to 4.5 and form a mouthwash-type base. Four-hundred eighty-three (483.0) ml of the mouthwash-type base was measured into a suitable container and 16 g of colored beads of a jelly-like substance was added. The liquid composition was simultaneously stirred and heated on a water-bath to a temperature of 100° F.

Seventeen (17) ml of the pre-gel solution was heated on a water bath at the same time and was added to the liquid composition when it reached a temperature of 100° F. When a fully homogeneous suspending solution was obtained, the solution was removed from the heat and bottled in suitable containers. The containers were sealed and stored at a temperature of 40° F. for 3 hours. After 3 hours, the containers were agitated by hand to disperse the jelly beads. The jelly beads remained suspended in the mouthwash-type suspending solution after dispersion.

EXAMPLE 5

A pre-gel solution was prepared as described in Example 1.

An alcoholic beverage was prepared by weighing 150 g high fructose corn syrup 55 D.E. into a suitable container and adding 500 ml cold water. The mixture was agitated to obtain a homogeneous solution and 0.30 g sodium benzoate powder was added and dissolved fully. Two (2) g citric acid anhydrous was added slowly with agitation and when fully dissolved, 16 g concentrated lemon juice having an acidity of 400 g per liter was added. After the lemon juice was fully integrated, 1 ml of a lemon flavor emulsion was added, followed by addition of 100 ml of 100 proof spirit with stirring. The volume was increased to 966 ml with water.

Seventy-five (75) g of colored, regularly-shaped pieces of a jelly-like substance were added with gentle stirring so as not to disrupt the jelly and the temperature was raised to 120° F. on a water bath. When this temperature was achieved, 34 ml of the pre-gel solution was added at 120° F. and fully incorporated. The alcoholic beverage suspending solution including the pieces of a jelly-like substance was bottled and sealed.

The bottles were stored for 3 hours and then agitated by hand to disperse the jelly pieces as well as the cloud derived from the lemon juice and flavor emulsion. The jelly pieces and cloud remained suspended in the alcoholic beverage.

It will thus be seen that the goals set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also understood that the following claims are intended to cover all of the generic and specific features of the invention herein described and all statements of the scope of the invention which, as a matter of language, might be said to fall therebetween.

Particularly it is to be understood that in said claims ingredients or compounds recited in the singular are intended to included compatible mixtures of such ingredients wherever the sense permits.

What is claimed is:

1. A method of suspending inclusions in an acidic or alcoholic liquid composition comprising:

preparing a pre-gel solution including between about 0.2% and 1.5% by weight gellan gum in water;

providing an acidic or alcoholic liquid composition having inclusions;

incorporating the pre-gel solution into the liquid composition to form a suspending solution;

permitting the suspending solution to rest for a predetermined period of time; and, agitating the rested suspending solution to suspend the inclusions.

2. The method of suspending inclusions of claim 1 wherein the pre-gel solution includes a buffer selected from the group consisting of sodium citrate, potassium citrate, and mixtures thereof.

3. The method of suspending inclusions of claim 2 wherein the buffer is present in an amount between about 0.1% and 0.5% by weight of the pre-gel solution.

4. The method of suspending inclusions of claim 1 wherein the liquid composition is acidic and has a pH between about 2.5 and 6.0.

5. The method of suspending inclusions of claim 1 wherein the liquid composition is alcoholic and has an alcohol content between about 5% and 40% by volume.

6. The method of suspending inclusions of claim 1 wherein the liquid composition has inclusions in an amount between about 1% and 10% by weight of the liquid composition.

7. The method of suspending inclusions of claim 1 wherein the inclusions are selected from the group consisting of pieces of a jelled substance, fruit pulp cells, fruit pulp particles, fruit pieces, edible gold particles, droplets of flavoring or clouding agents, and combinations thereof.

8. The method of suspending inclusions of claim 1 wherein the pre-gel solution is incorporated into the liquid composition in an amount between about 2% and 17.5% by volume.

9. The method of suspending inclusions of claim 1 wherein the pre-gel solution is incorporated into the liquid composition at a temperature between about 40° F. and 120° F.

10. A method of suspending inclusions in an acidic or alcoholic liquid composition comprising:

preparing a pre-gel solution including between about 0.2% and 1.5% by weight gellan gum in water;

providing an acidic or alcoholic liquid composition;

incorporating the pre-gel solution into the liquid composition to form a suspending solution; adding inclusions to the suspending solution;

permitting the suspending solution to rest for a predetermined period of time; and, agitating the rested suspending solution to suspend the inclusions.

11. The method of suspending inclusions of claim 10 wherein the pre-gel solution includes a buffer selected from the group consisting of sodium citrate, potassium citrate, and mixtures thereof.

12. The method of suspending inclusions of claim 11 wherein the buffer is present in an amount between about 0.1% and 0.5% by weight of the pre-gel solution.

13. The method of suspending inclusions of claim 10 wherein the liquid composition is acidic and has a pH between about 2.5 and 6.0.

14. The method of suspending inclusions of claim 10 wherein the liquid composition is alcoholic and has an alcohol content of between about 5% and 40% by volume.

15. The method of suspending inclusions of claim 10 wherein the liquid composition has inclusions in an amount between about 1% and 10% by weight of the liquid composition.

16. The method of suspending inclusions of claim 10 wherein the inclusions are selected from the group consisting of pieces of a jelled substance, fruit pulp cells, fruit pulp particles, fruit pieces, edible gold particles, droplets of flavoring or clouding agents, and combinations thereof.

17. The method of suspending inclusions of claim 10 wherein the pre-gel solution is incorporated into the liquid composition in an amount between about 2% and 17.5% by volume.

18. The method of suspending inclusions of claim 10 wherein the pre-gel solution is incorporated into the liquid composition at a temperature between about 40° F. and 120° F.

19. A liquid composition having suspended inclusions comprising an alcoholic or acidic liquid composition having between about 0.02% and 0.05% by weight gellan gum and between about 1% and 10% by weight inclusions suspended throughout the liquid composition.

20. The liquid composition of claim 19 wherein the composition is an acidic liquid composition having a pH between about 2.5 and 6.0.

21. The liquid composition of claim 19 wherein the composition is an alcoholic liquid composition having between about 5% and 40% alcohol by volume.

22. The liquid composition of claim 19 wherein the inclusions are selected from the group consisting of pieces of a jelled substance, fruit pulp cells, fruit pulp particles, fruit pieces, edible gold particles, droplets of flavoring or clouding agents, and combinations thereof.

* * * * *